United States Patent
Salman et al.

(10) Patent No.: US 7,133,755 B2
(45) Date of Patent: Nov. 7, 2006

(54) STATE OF HEALTH MONITORING AND FAULT DIAGNOSIS FOR INTEGRATED VEHICLE STABILITY SYSTEM

(75) Inventors: Mutasim A. Salman, Rochester Hills, MI (US); Mark N. Howell, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 276 days.

(21) Appl. No.: 10/899,445

(22) Filed: Jul. 26, 2004

(65) Prior Publication Data

US 2006/0020379 A1    Jan. 26, 2006

(51) Int. Cl.
*G06F 7/00* (2006.01)

(52) U.S. Cl. .............................. 701/29; 701/33; 701/34; 340/438

(58) Field of Classification Search .................. 701/29, 701/33, 34; 340/425.5, 438; 700/258; 702/104, 702/108, 116
See application file for complete search history.

(56) References Cited

U.S. PATENT DOCUMENTS

| 5,707,117 A | 1/1998 | Hu et al. |
| 6,625,527 B1 | 9/2003 | Ding et al. |
| 6,925,796 B1 * | 8/2005 | Nieuwstadt et al. .......... 60/277 |

* cited by examiner

*Primary Examiner*—Y. Beaulieu
(74) *Attorney, Agent, or Firm*—Kathryn A. Marra

(57) ABSTRACT

A system and method for providing state of health monitoring and fault diagnostics for a vehicle stability system. The system includes at least one primary sensor and at least one secondary sensor for sensing the operation of at least one vehicle characteristic. The system calculates an estimated output of the primary sensor using at least one estimate model, and generates at least one residual as the difference between a measured output of the primary sensor and the estimated output of the estimate model. The system uses a residual pattern to determine if the primary sensor is faulty. The system compares the measured output of the primary sensor to a measured output of the secondary sensor if the residual is less than a threshold, and determines that the secondary sensor is faulty if the comparison between the measured outputs of the primary and secondary sensors is greater than a predetermined threshold.

23 Claims, 2 Drawing Sheets

STATE OF HEALTH MONITORING AND FAULT DIAGNOSIS FOR INTEGRATED VEHICLE STABILITY SYSTEM

BACKGROUND OF THE INVENTION

1. Field of the Invention

This invention relates generally to a system for providing state of health monitoring and fault diagnostics for a vehicle stability system and, more particularly, to a state of health monitoring and fault diagnostics system for a vehicle stability system, where the diagnostics system employs sensor information fusion.

2. Discussion of the Related Art

Diagnostics monitoring for vehicle stability systems is an important vehicle design consideration to be able to detect system faults quickly, and isolate the faults for maintenance purposes. These stability systems typically employ various types of sensors, including yaw rate sensors, lateral acceleration sensors and steering hand wheel angle sensors, that are used to provide the stability control of the vehicle. For example, certain vehicle stability systems employ automatic braking in response to an undesired turning or yaw rate of the vehicle. Certain vehicle stability systems also employ active front-wheel or rear-wheel steering that assists the vehicle operator in steering the vehicle in response to the detected rotation of the steering wheel. Other vehicle stability systems employ active suspension stability systems that change the vehicle suspension in response to road conditions and vehicle operating conditions.

If any of the sensors and actuators associated with these stability systems fail, it is desirable to quickly detect the fault and activate fail-safe strategies so as to prevent the system from improperly responding to a perceived condition. It is also desirable to isolate the defective sensor or actuator for maintenance and replacement purposes, and also select the proper action for the problem. Thus, it is necessary to monitor the various sensors, actuators and components employed in these stability systems to identify a failure.

SUMMARY OF THE INVENTION

In accordance with the teachings of the present invention, a system and method for providing state of health monitoring and fault diagnostics for a vehicle stability system is disclosed. In one embodiment, the system includes a primary yaw rate sensor and a secondary yaw rate sensor for sensing the yaw rate of the vehicle, and a primary lateral acceleration sensor and a secondary lateral acceleration sensor for sensing the lateral acceleration of the vehicle. The system calculates estimated outputs of the primary yaw rate sensor and estimated outputs of the primary lateral acceleration sensor using a plurality of different estimate models. The system generates residuals as the difference between a measured output of the primary yaw rate sensor and the estimated outputs and residuals as the difference between a measured output of the primary lateral acceleration sensor and the estimated outputs.

The system compares each residual to a predetermined threshold and gives the residual a first value if the residual is below the threshold and a second value if the residual is above the threshold. The system determines that the primary yaw rate sensor is not faulty if all of the yaw rate sensor residuals have the first value, and determines that the primary lateral acceleration sensor is not faulty if all of the lateral acceleration sensor residuals have the first value. The system compares the yaw rate sensor residuals to a predetermined residual matrix if one of the yaw rate sensor residuals is the second value, and compares the lateral acceleration sensor residuals to a predetermined residual matrix if one of the lateral acceleration sensor residuals is the second value. The system determines that the primary yaw rate sensor is faulty if the yaw rate sensor residuals are close to or match the residual matrix, and determines that the primary lateral acceleration sensor is faulty if the lateral acceleration sensor residuals are close to or match the residual matrix.

The system compares the measured output of the primary yaw rate sensor to a measured output of the secondary yaw rate sensor if all of the yaw rate sensor residuals are the first value, and compares the measured output of the primary lateral acceleration sensor to a measured output of the secondary lateral acceleration sensor if all of the lateral acceleration sensor residuals are the first value. The system determines that the secondary yaw rate sensor is faulty if the difference between the measured outputs of the primary yaw rate sensor and the secondary yaw rate sensor is above a predetermined threshold, and determines that the secondary lateral acceleration sensor is faulty if the difference between the measured outputs of the primary lateral acceleration sensor and the secondary lateral acceleration sensor is above a predetermined threshold.

Also in one embodiment, the system determines a road wheel angle of the vehicle. The system calculates a plurality of estimated outputs of the road wheel angle using a plurality of different road wheel angle estimate models, and generates a plurality of road wheel angle residuals as the difference between the road wheel angle and the plurality of estimated outputs from the plurality of road wheel angle estimate models. The system compares the road wheel angle residuals to a predetermined threshold and gives the road wheel angle residual a first value if the residual is below the threshold and gives the road wheel angle residual a second value if the residual is above the threshold, and determines that the road wheel angle signal is not faulty if all of the road wheel angle residuals have the first value.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a system and method for monitoring the state of health and providing fault diagnostics for an integrated vehicle stability system is merely exemplary in nature, and is in no way intended to limit the invention or its applications or uses.

Figure 1:
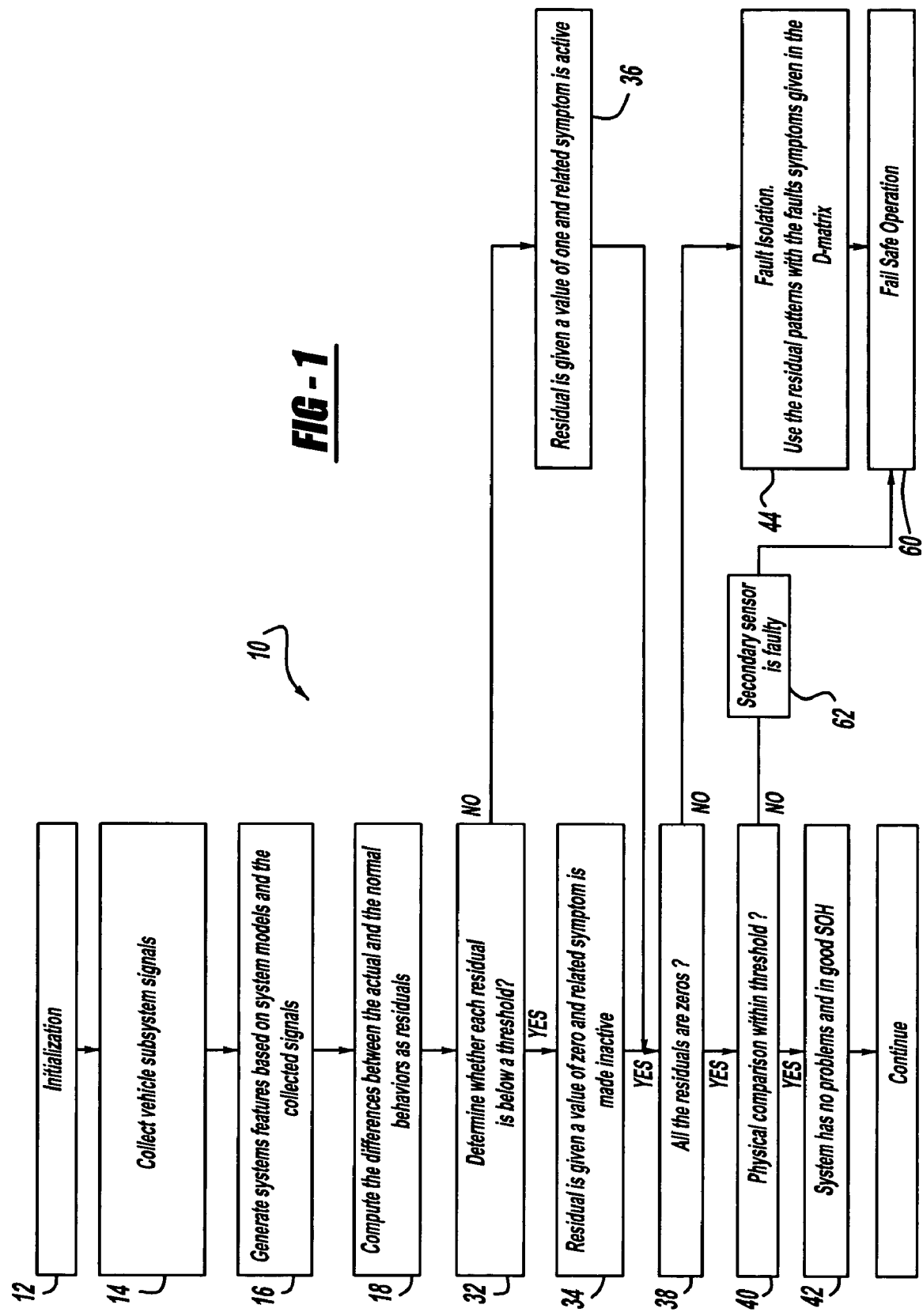
FIG. 1 is a flow chart diagram of a process for providing state of health monitoring and fault diagnostics for a vehicle stability system, according to an embodiment of the present invention.

FIG. 1 is a flow chart diagram 10 showing a process for monitoring the state of health and providing fault diagnostics of an integrated vehicle stability system, according to an embodiment of the present invention. In one embodiment, the integrated control system includes an active braking control sub-system, an active front-wheel steering assist sub-system and a semi-active suspension sub-system, known to those skilled in the art. The integrated control system includes primary and a secondary vehicle yaw rate sensors and primary and a secondary vehicle lateral acceleration sensors. The dual yaw rate and lateral acceleration sensors are provided for physical redundancy purposes and the ability to provide a fast and reliable detection of faults, as will be discussed below. The control system also includes a hand wheel position sensor and a motor actuator position sensor that indirectly determine the road wheel angle.

Each component and sub-system includes its own diagnostics provided by the component supplier that is detected by the algorithm of the present invention in a supervisory manner. The diagnostics algorithm collects the diagnostics signals from the sub-systems and the components, and uses information fusion to detect and isolate faults in the system. The diagnostics algorithm receives controller area network (CAN) communications signals from the components and the sub-systems. These signals include signals from the primary and secondary yaw rate sensors, signals from the primary and secondary lateral acceleration sensors, a road wheel angle signal, a reference vehicle speed signal, a vehicle roll rate signal, a vehicle pitch rate, normal forces, etc.

The algorithm that performs the state of health monitoring is first initialized at box 12. Then, the algorithm collects the signals from the various vehicle sensors, actuators and sub-systems at box 14. At this point of the process, various signal processing has already been performed, including, but not limited to, sensor calibration and centering, limit checks, reasonableness of output values and physical comparison, such as was described in co-owned U.S. Patent Application Ser. No. (GP-304686).

The algorithm then generates system features based on system models and the collected and checked signals at box 16. In order to determine which of the various sensors and sub-systems may have failed, the algorithm uses predetermined analytical equations or estimate models to calculate three estimates of the vehicle yaw rate (YR), the vehicle lateral acceleration (Ay) and the road wheel angle (RWA) from the several sensor signals. These estimate models are shown in Table 1 below where u is the vehicle speed, L is the vehicle wheel-base and K is the vehicle understeer coefficient. These particular estimate models are provided by way of a non-limiting example in that other model equations may also be applicable. Each model is based on a different equation for the particular sensor and uses actual measured values. Before the algorithm calculates the estimates, it checks for certain conditions, such as road wheel angle below a certain value and vehicle speed below a certain speed. At this point in the process, the algorithm only determines the estimate models for the primary yaw rate sensor and the primary lateral acceleration sensor.

Figure 2:
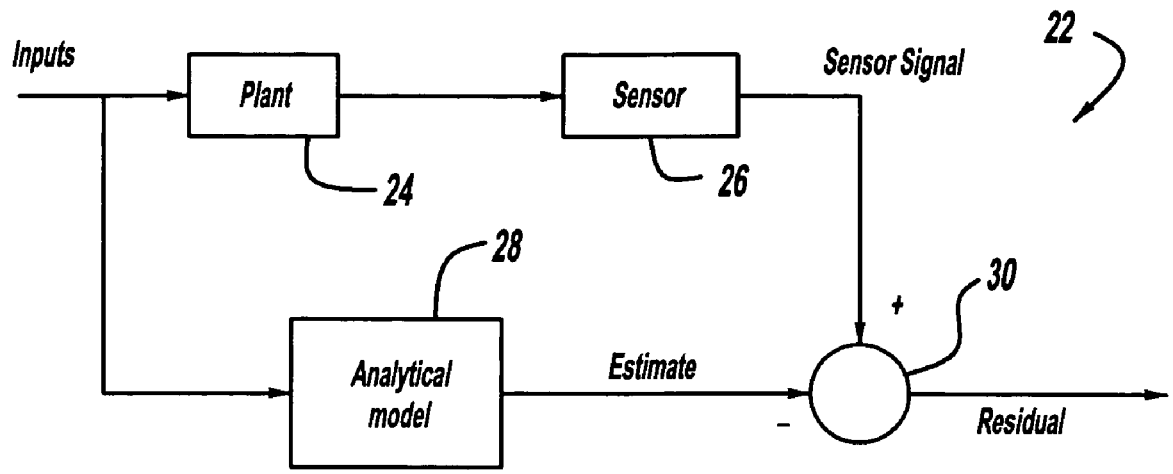
FIG. 2 is a block diagram showing a process of computing residuals for the process shown in FIG. 1.

The algorithm then determines a residual as the difference between the measured signal from each sensor and the estimated signal for each model of each sensor at box 18. FIG. 2 is a block diagram of a system 22 for determining the residuals based on this difference. Inputs are applied to a plant process box 24 and then to a sensor 26, representing any of the actual sensors, to generate the actual sensor signal. The inputs are also applied to each of the various analytical models shown in Table 1 to generate the estimate for each of the yaw rate, the lateral acceleration and the road wheel angle at box 28. The sensor signal from the sensor 26 and the estimate from the analytical model are then compared by a comparator 30 that generates the residual for the particular sensor and the particular estimate model. From these calculations there are nine residuals, three for the primary yaw rate sensor, three for the primary lateral acceleration sensor and three for the road wheel angle measurement.

Returning to FIG. 1, each residual is then compared to a predetermined threshold at box 32 to determine whether the residual is greater than the threshold, which may indicate a problem. The threshold values are calibration parameters and should be large enough to account for both signal errors and model inaccuracies to reduce false alarms. On the other hand, the threshold values should be small enough so as to not endanger vehicle stability performance. Table 2 below shows the calculated value (R1–R9) for each of the estimate models in the horizontal column, and the residual pattern for the primary yaw rate sensor (F1), the primary lateral acceleration sensor (F2), a vehicle reference speed (F3) and the road wheel angle (F4) in the vertical column, where each box is assigned a 0 or a 1 value. If the residual for a particular estimate model is less than the threshold at the box 32, then the residual is assigned the 0 value in the Table 2, and a corresponding fault symptom is set inactive at box 34. The fault symptom is the particular digital flag for that particular model, and is a response result for the measured signal from the sensor.

TABLE 2

|  | F1 Yaw Rate Sensor | F2 Lateral Acceleration | F3 Vehicle Ref. Speed | F4 Road Wheel Angle |
|---|---|---|---|---|
| YR:R1 | 1 | 1 | 1 | 0 |
| YR:R2 | 1 | 0 | 1 | 1 |
| YR:R3 | 1 | 1 | 1 | 1 |
| Ay:R4 | 1 | 1 | 1 | 0 |
| Ay:R5 | 0 | 1 | 1 | 1 |
| Ay:R6 | 1 | 1 | 1 | 1 |
| RWA:R7 | 0 | 1 | 1 | 1 |
| RWA:R8 | 1 | 0 | 1 | 1 |
| RWA:R9 | 1 | 1 | 1 | 1 |

If the residual is above the threshold, then the residual is assigned the 1 value in the Table 2 and the corresponding fault symptom is set active at box 36. If the particular model is assigned a 1 value in the Table 2, it is an indication that

TABLE 1

|  | Yaw Rate (YR) | Lateral Acceleration (Ay) | Road Wheel Angle (RWA) |
|---|---|---|---|
| Model 1 | $YR_{est} = Ay/u$ | $Ay_{est} = YR * u$ | $RWA_{est} = (L/u + K) * Ay$ |
| Model 2 | $YR_{est} = RWA * u/(L + Ku^2)$ | $Ay_{est} = RWA * u^2/(L + Ku^2)$ | $RWA_{est} = YR * ((L + Ku^2)/u)$ |
| Model 3 | $YR_{est} = u/L * (RWA - K * Ay)$ | $Ay_{est} = (RWA - L/u * YR)/K$ | $RWA_{est} = YR * L/u + KAy$ | the sensor for that model has a potential problem. However, the entire pattern of 0 and 1 values for a particular sensor in the Table 2 is analyzed to determine whether a problem exists. The values in the Table 2 are just an example of one sequence of 0s and 1s for a particular system.

The algorithm then determines if all of the residuals have a 0 value for each of the primary yaw rate sensor, the primary acceleration sensor and the road wheel angle signal at box 38. If all the residuals are a 0 value at the box 38, then the algorithm compares the actual output of the primary yaw rate sensor and the secondary yaw rate sensor and compares the actual output of the primary acceleration sensor and the secondary acceleration sensor to determine whether the comparisons are within a predetermined threshold at box 40.

If all of the residuals for the primary yaw rate sensor are a 0 value, and the comparison between the outputs of the primary yaw rate sensor and the secondary yaw rate sensor is within the threshold, then it is assumed that both the primary and secondary yaw rate sensors are operating properly. If the residuals for the primary lateral acceleration sensor are all a 0 value, and the comparison between the output of the primary and secondary lateral acceleration sensors is within the threshold, then it is assumed that both the primary and the secondary acceleration sensors are operating properly.

Figure 3:
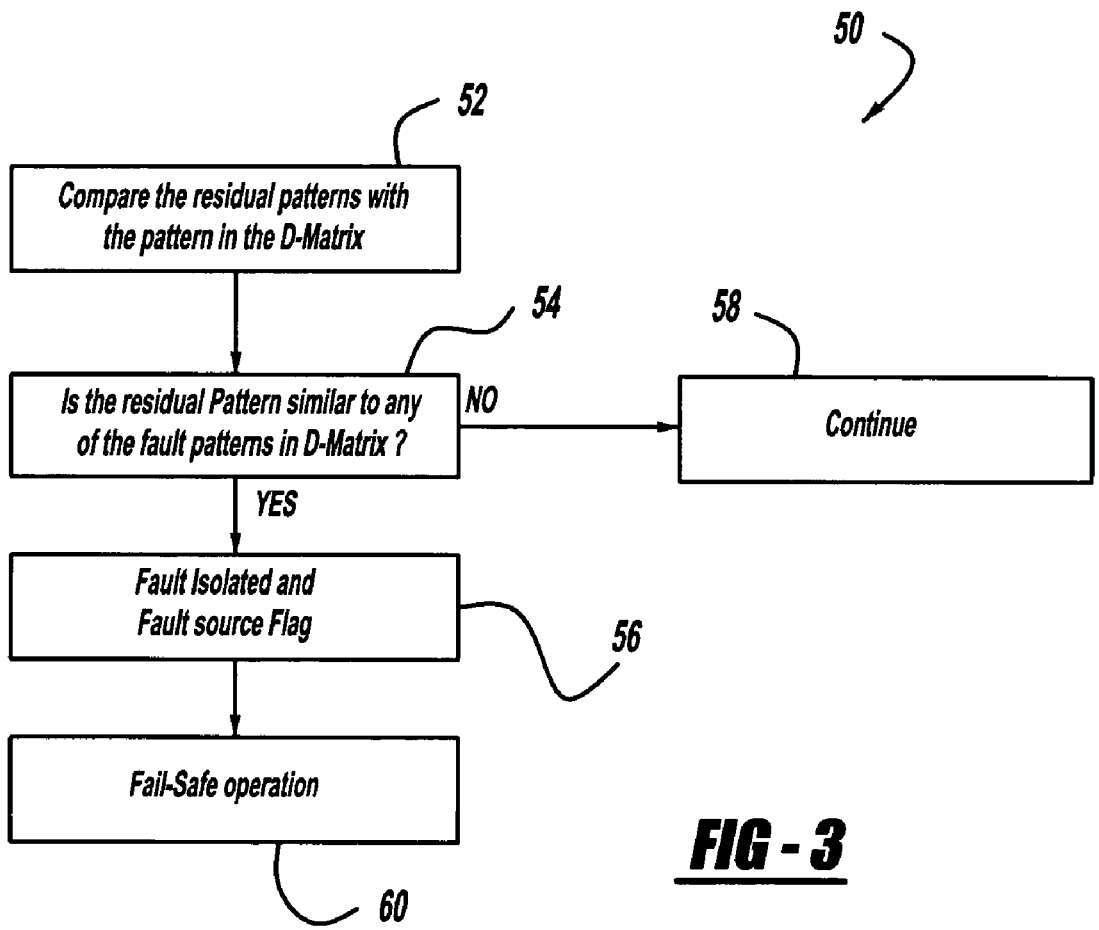
FIG. 3 is a flow chart diagram of a process for providing fault isolation for the process shown in FIG. 1.

If all the residuals are not a 0 value at the box 38, then the algorithm performs a fault isolation process at box 44. FIG. 3 is a flow chart diagram 50 showing the operation of providing the fault isolation. In the diagram 50, the algorithm first compares the residual pattern with the pattern in the matrix (D-matrix) shown in Table 2 at box 52. The pattern of 0 and 1 values in Table 2 for that sensor or measurement provides an indication of whether the primary yaw rate sensor is faulty, the primary lateral acceleration sensor is faulty, the vehicle reference speed is faulty or the road wheel angle measurement signal is faulty. In other words, the residuals must provide that specific pattern of 0 and 1 values for the sensor or measurement to be faulty.

The algorithm determines whether the residual pattern is similar to any of the fault patterns in the D-matrix shown in the Table 2 at box 54. If the residual pattern for a particular sensor or measurement is similar to an estimation model fault pattern shown in the D-matrix of Table 2, then the algorithm knows a problem or fault exists and sets a fault isolation flag at box 56. The algorithm will go into a fail-safe operation at box 60 for the particular sensor or measurement that has a fault. A predetermined look-up table is provided so that the algorithm knows what fail-safe operation to perform for the particular fault. Depending on which fault source flag the algorithm sets, the control system determines which of the sensors needs to be replaced. If the residual pattern is not similar to any of the fault patterns in the D-matrix at the box 54, the algorithm determines that the system is operating properly and continues with the analysis at box 58.

If the algorithm determines that the physical comparison between the outputs of the primary and secondary yaw rate sensors or the physical comparison between the outputs of the primary and secondary lateral acceleration sensors is greater than the threshold at the box 40, the algorithm sets the fault flag for the particular secondary sensor at box 62. The algorithm will then go to the fail-safe mode at the box 60 for that fault.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a state of health of an integrated vehicle stability system, said method comprising:
providing at least one primary sensor and at least one secondary sensor for sensing the operation of at least one vehicle characteristic;
calculating an estimated output of the at least one primary sensor using at least one estimate model;
generating at least one residual as the difference between a measured output of the primary sensor and the estimated output of the at least one estimate model; and
using the residual to determine if the primary sensor is faulty.

2. The method according to claim 1 wherein using the residual to determine if the primary sensor is faulty includes comparing the residual to a predetermined threshold, wherein the primary sensor is not faulty if the residual is less than the threshold and the primary sensor may be faulty if the residual is above the threshold.

3. The method according to claim 2 further comprising comparing the measured output of the at least one primary sensor to a measured output of the at least one secondary sensor if the residual is less than the threshold, and determining that the secondary sensor is faulty if the comparison between the measured outputs of the primary and secondary sensors is greater than a predetermined threshold.

4. The method according to claim 1 wherein calculating an estimated output of the at least one primary sensor using at least one estimate model includes calculating a plurality of estimated outputs of the at least one primary sensor using a plurality of different estimate models, and wherein generating at least one residual as the difference between a measured output of the primary sensor and the estimated output of the at least one estimate model includes generating a plurality of residuals as the difference between the measured output of the primary sensor and the estimated outputs of the plurality of estimate models.

5. The method according to claim 4 wherein using the residual to determine if the primary sensor is faulty includes comparing a pattern of the plurality of residuals to a predetermined matrix of values, and determining that the sensor is faulty if the pattern of residuals is close to or matches the matrix of values.

6. The method according to claim 4 wherein calculating a plurality of estimated outputs of the at least one primary sensor using a plurality of different estimate models includes calculating three estimated outputs of the at least one primary sensor using three different estimate models.

7. The method according to claim 1 wherein providing at least one primary sensor and at least one secondary sensor includes providing a primary yaw rate sensor and a secondary yaw rate sensor for sensing a yaw rate of the vehicle.

8. The method according to claim 1 wherein providing at least one primary sensor and at least one secondary sensor includes providing a primary lateral acceleration sensor and a secondary lateral acceleration sensor for sensing the lateral acceleration of the vehicle.

9. The method according to claim 1 further comprising determining a road wheel angle of the vehicle, calculating a plurality of estimated outputs of the road wheel angle using a plurality of different road wheel angle estimate models, generating a plurality of road wheel angle residuals as the difference between the road wheel angle and the plurality of estimated outputs from the plurality of road wheel angle estimate models, comparing the road wheel angle residuals to a predetermined threshold and giving the road wheel angle residual a first value if the residual is below the threshold and giving the road wheel angle residual a second value if the residual is above the threshold, and determining that the road wheel angle is not faulty if all of the road wheel angle residuals have the first value.

10. The method according to claim 1 wherein the integrated vehicle stability system includes an active braking control sub-system, an active front-wheel steering assist sub-system and a semi-active suspension sub-system.

11. A method for determining a state of health of an integrated vehicle stability system, said method comprising:
providing a primary yaw rate sensor and a secondary yaw rate sensor for sensing the yaw rate of the vehicle;
providing a primary lateral acceleration sensor and a secondary lateral acceleration sensor for sensing the lateral acceleration of the vehicle;
calculating a plurality of estimated outputs of the primary yaw rate sensor using a plurality of different yaw rate estimate models;
calculating a plurality of estimated outputs of the primary lateral acceleration sensor using a plurality of different lateral acceleration estimate models;
generating a plurality of yaw rate residuals as the difference between a measured output of the primary yaw rate sensor and the plurality of estimated outputs from the plurality of yaw rate estimate models;
generating a plurality of lateral acceleration residuals as the difference between a measured output of the primary lateral acceleration sensor and the plurality of estimated outputs from the plurality of lateral acceleration estimate models;
comparing the yaw rate and the lateral acceleration residuals to a predetermined threshold and giving the residual a first value if the residual is below the threshold and giving the residual a second value if the residual is above the threshold;
determining that the primary yaw rate sensor is not faulty if all of the yaw rate residuals have the first value;
determining that the primary lateral acceleration sensor is not faulty if all of the lateral acceleration residuals have the first value;
comparing the plurality of yaw rate residuals to a predetermined yaw rate residual matrix if one of the yaw rate residuals is the second value;
comparing the plurality of lateral acceleration residuals to a predetermined lateral acceleration residual matrix if one of the lateral acceleration residuals is the second value;
determining that the primary yaw rate sensor is faulty if the plurality of yaw rate residuals is close to or matches the yaw rate residual matrix;
determining that the primary lateral acceleration sensor is faulty if the plurality of lateral acceleration residuals is close to or matches the lateral acceleration residual matrix;
comparing the measured output of the primary yaw rate sensor to a measured output of the secondary yaw rate sensor if all of the yaw rate residuals are the first value;
comparing the measured output of the primary lateral acceleration sensor to a measured output of the secondary lateral acceleration sensor if all of the lateral acceleration residuals are the first value;
determining that the secondary yaw rate sensor is faulty if the difference between the measured outputs of the primary yaw rate sensor and the secondary yaw rate sensor is above a predetermined threshold; and
determining that the secondary lateral acceleration sensor is faulty if the difference between the measured outputs of the primary lateral acceleration sensor and the secondary lateral acceleration sensor is above a predetermined threshold.

12. The method according to claim 11 further comprising determining a road wheel angle of the vehicle, calculating a plurality of estimated outputs of the road wheel angle using a plurality of different road wheel angle estimate models, generating a plurality of road wheel angle residuals as the difference between the road wheel angle and the plurality of estimated outputs from the plurality of road wheel angle estimate models, comparing the road wheel angle residuals to a predetermined threshold and giving the road wheel angle residual a first value if the residual is below the threshold and giving the road wheel angle residual a second value if the residual is above the threshold, and determining that the road wheel angle is not faulty if all of the road wheel angle residuals have the first value.

13. The method according to claim 11 wherein the integrated vehicle stability system includes an active braking control sub-system, an active front-wheel steering assist sub-system and a semi-active suspension sub-system.

14. A system for determining a state of health of an integrated vehicle stability system, said system comprising:
at least one primary sensor and at least one secondary sensor for sensing the operation of at least one vehicle characteristic;
means for calculating an estimated output of the at least one primary sensor using at least one estimate model;
means for generating at least one residual as the difference between a measured output of the primary sensor and the estimated output of the at least one estimate model; and
means for using the residual to determine if the primary sensor is faulty.

15. The system according to claim 14 wherein the means for using the residual to determine if the primary sensor is faulty includes means for comparing the residual to a predetermined threshold, wherein the primary sensor is not faulty if the residual is less than the threshold and the primary sensor may be faulty if the residual is above the threshold.

16. The system according to claim 15 further comprising means for comparing the measured output of the at least one primary sensor to a measured output of the at least one secondary sensor if the residual is less than the threshold, and means for determining that the secondary sensor is faulty if the comparison between the measured outputs of the primary and secondary sensors is greater than a predetermined threshold.

17. The system according to claim 14 wherein the means for calculating an estimated output of the at least one primary sensor using at least one estimate model includes means for calculating a plurality of estimated outputs of the at least one primary sensor using a plurality different estimate models, and wherein the means for generating at least one residual as the difference between a measured output of the primary sensor and the estimated output of the at least one estimate model includes means for generating a plurality of residuals as the difference between the measured output of the primary sensor and the estimated outputs of the plurality of estimate models.

18. The system according to claim 17 wherein the means for using the residual to determine if the primary sensor is faulty includes means for comparing a pattern of the plurality of residuals to a predetermined matrix of values, and means for determining that the primary sensor is faulty if the pattern of residuals is close to or matches the matrix of values.

19. The system according to claim 17 wherein the means for calculating a plurality of estimated outputs of the at least one primary sensor using a plurality different estimate models includes means for calculating three estimated outputs of the at least one primary sensor using three different estimate models.

20. The system according to claim 14 wherein the at least one primary sensor and at least one secondary sensor include a primary yaw rate sensor and a secondary yaw rate sensor for sensing a yaw rate of the vehicle.

21. The system according to claim 14 wherein the at least one primary sensor and the at least one secondary sensor include a primary lateral acceleration sensor and a secondary lateral acceleration sensor for sensing the lateral acceleration of the vehicle.

22. The system according to claim 14 further comprising means for determining a road wheel angle of the vehicle, means for calculating a plurality of estimated outputs of the road wheel angle using a plurality of different road wheel angle estimate models, means for generating a plurality of road wheel angle residuals as the difference between the measured road wheel angle and the plurality of estimated outputs from the plurality of road wheel angle estimate models, means for comparing the road wheel angle residuals to a predetermined threshold and giving the road wheel angle residual a first value if the residual is below the threshold and giving the road wheel angle residual a second value if the residual is above the threshold, and means for determining that the road wheel angle is not faulty if all of the road wheel angle residuals have the first value.

23. The system according to claim 14 wherein the integrated vehicle stability system includes an active braking control sub-system, an active front-wheel steering assist sub-system and a semi-active suspension sub-system.

* * * * *